United States Patent [19]

Puckette

[11] 3,820,051

[45] June 25, 1974

[54] ADAPTIVE THRESHOLD CIRCUIT EMPLOYING NAND GATES INTERCONNECTING FLIP-FLOP CIRCUIT

[75] Inventor: Charles McD. Puckette, Scotia, N.Y.

[73] Assignee: General Electric Company, Schenectady, N.Y.

[22] Filed: Apr. 21, 1971

[21] Appl. No.: 136,101

Related U.S. Application Data

[62] Division of Ser. No. 868,701, Oct. 23, 1969, Pat. No. 3,626,306.

[52] U.S. Cl. .................... 328/71, 307/242, 307/247, 307/215

[51] Int. Cl. ....................... H03k 17/02, H03k 19/36

[58] Field of Search .................... 307/215, 242, 247; 328/133, 71

[56] References Cited

UNITED STATES PATENTS

| | | | |
|---|---|---|---|
| 2,985,773 | 5/1961 | Dobbie | 307/215 |
| 3,328,688 | 6/1967 | Brooks | 328/133 X |
| 3,482,132 | 12/1969 | Emde | 328/133 X |

*Primary Examiner*—John S. Heyman
*Attorney, Agent, or Firm*—Louis A. Moucha; Joseph T. Cohen; Jerome C. Squillaro

[57] ABSTRACT

A method and circuit for synchronizing the receiver sampling pulse train with a received analog data waveform in the receiver analog-to-digital converter in a synchronous data communication system utilizes the average time of occurrence of the zero slope points of the received waveform to obtain the synchronous condition. A zero slope detector detects the points of zero slope and each detected zero slope passes a clock pulse of repetition rate higher than the sampling pulse train rate to an up-down counter. The receiver time base in square waveform controls the count direction of the counter, and successively repeated overflows (or underflows) of the counter add (or inhibit) single pulses to a digital phase shifter which shifts by a small fractional period the receiver time base waveform and the sampling pulse train in the proper direction for synchronization with the received analog data waveform.

2 Claims, 3 Drawing Figures

Inventor:
Charles M. Puckette,
by Louis A. Moucha

Inventor:
Charles M. Puckette,
by Louis A. Moucha

ADAPTIVE THRESHOLD CIRCUIT EMPLOYING NAND GATES INTERCONNECTING FLIP-FLOP CIRCUIT

This is a division of application Ser. No. 868,701, filed Oct. 23, 1969, now U.S. Pat. No. 3,626,306.

My invention relates to an electronic synchronizer circuit, and in particular, to a circuit for synchronizing a sampling pulse train in a receiver analog-to-digital converter data communication system.

High speed data communication systems, and in particular synchronous data systems utilizing multi-level data coded (symbol) formats, require an accurate sampling time for the decision-making process in the analog-to-digital (A/D) converter of the receiver which converts the received analog data waveform to a serial binary format. In the synchronous data communication system, the receiver A/D converter samples the received data waveform at discrete points in time, the spacing of these sampling points being equal to the period of one information symbol. The sampling points, commonly called the receiver sampling pulse train, are normally developed from a clock generator in the receiver, and the repetition rate is controlled to be equal to the transmitted data rate. The actual channel over which the information is transmitted, such as telephone wire, is not an ideal medium and generally causes undesired phase shifts in the received analog data waveform as compared to the transmitted waveform. This phase shift is especially important in multi-level coded waveforms and requires precise synchronization of the receiver sampling pulse train with the received analog data waveform to achieve the optimum decision-making point on the received data waveform and thereby prevent errors in the data recovery process.

Three of the most common techniques for synchronizing the receiver sampling pulse train to the received data waveform are (1) average threshold crossing, (2) sampling point derivative and (3) autocorrelation. The average threshold crossing technique utilizes a detector for generating an error signal every time that the data waveform crosses zero (or some other specific value), the magnitude of the error signal being directly related to the time between the threshold cross and the sampling pulse displaced in time by one-half a symbol period. Application of this technique to the multi-level coded systems requires that thresholds be established between each of the x possible signal levels requiring $x$-1 threshold detectors. A further disadvantage of this technique is that the threshold levels must also be related to the staircase function of the A/D converter which implies a DC tracking requirement between the threshold detector circuits and the A/D converter. Finally, this first technique also requires a suitable means for averaging the respective outputs of the threshold detectors which requires a complex filtering process to derive the sampling pulse train in the multi-level coded system. The second technique requires sampling the received data waveform at a time determined by the peak value of its derivative by generating error signals that are proportional to the signal's time derivative at the sampling point multiplied by the signal's polarity at that time. The extension of this second technique to multi-level coded systems requires weighting the signal derivative in terms of the symbol multi-level value. The third technique is based on the autocorrelation properties of a psuedo-random sequence that is transmitted during the initial alignment phase of the data transmission system. The autocorrelation function of such a sequence is well known to be a comb struture with the teeth spacing related to the sequence length. The required synchronization is obtained by generating a duplicate pseudo-random sequence at the receiver which is correlated against the received sequence, the phasing of the receiver clock controlling the degree of correlation between the two waveforms. This third technique requires multiplication and integration steps to obtain the correlation as well as a duplicate pseudo-random sequence at the receiver.

Therefore, one of the principal objects of my invention is to provide a new simplified method and apparatus for synchronizing a receiver sampling pulse train with a received analog data waveform, and is especially adapted for use with multi-level coded transmission in synchronous data communication systems.

Another object of my invention is to provide the method and apparatus utilizing the average time of occurrence of the zero slope points of the received waveform.

A still further object of my invention is to provide an adaptive threshold circuit which permits corrective action in the apparatus only upon two identical commands being successively generated.

Briefly summarized, my invention is a method and circuit apparatus for synchronizing a receiver sampling pulse train with a received analog data waveform in a synchronous data communication system wherein the sampling pulse train is synchronized with the average time of occurrence of the zero slope points of the received data waveform. A zero-slope detector detects the points of zero slope and each detected zero slope passes a single pulse of the receiver clock which is at a repetition rate equal to a first particular multiple of the sampling pulse train, to an up-down counter. The receiver time base in square waveform controls the count direction of the counter, and successively repeated overflows or underflows of the counter add or inhibit single pulses of repetition rate equal to a second particular multiple of the sampling pulse train to a digital phase shifter which shifts the receiver time base waveform in the proper direction to obtain a phase-lock of the positive-to-negative transition thereof with the average time of occurrence of the zero slope points of the received analog data waveform, and resultant synchronization of the sampling pulse train therewith.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein:

Figure 1:
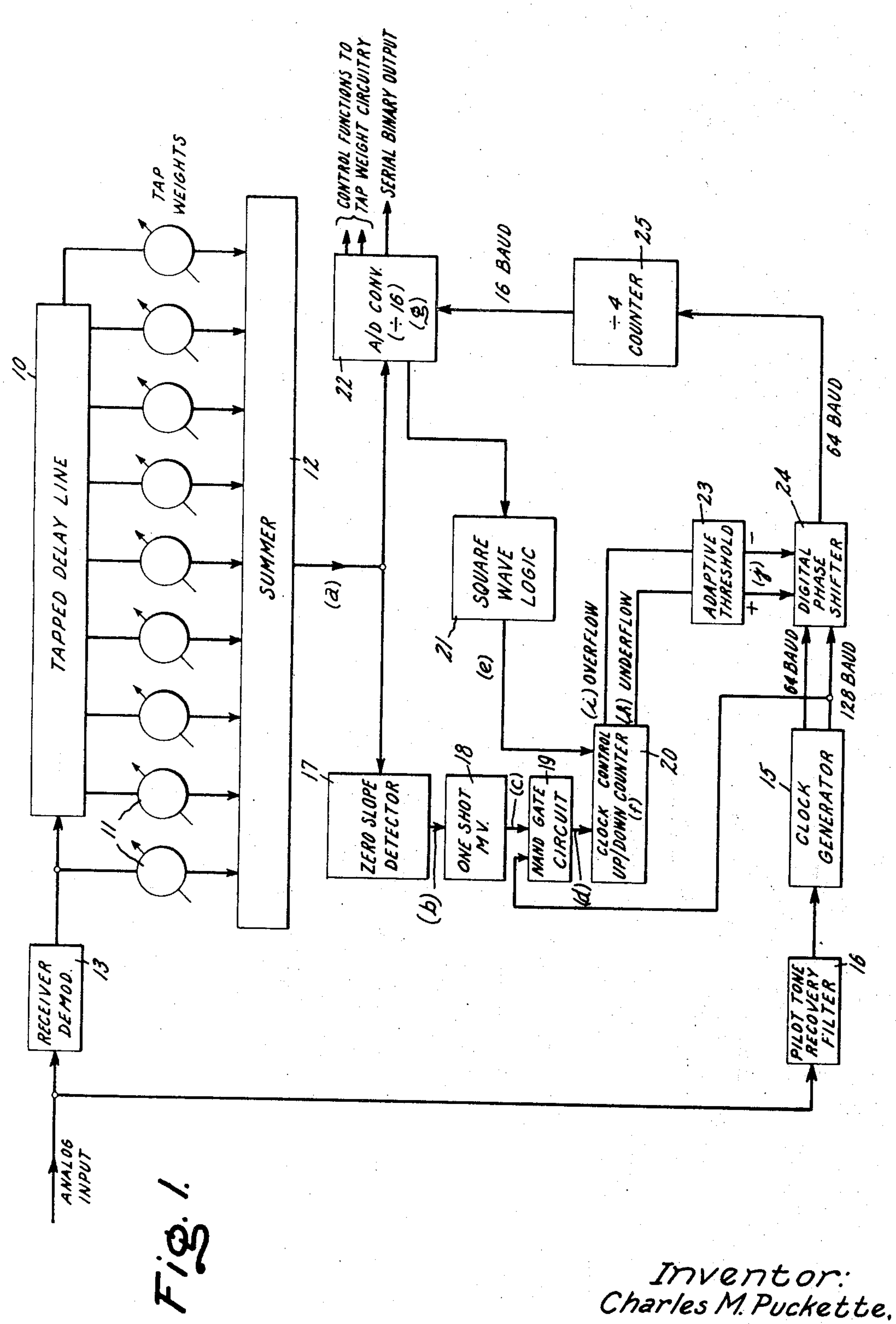
FIG. 1 is a block diagram of my automatic baud synchronizer and a variable transversal type filter.

Referring now in particular to FIG. 1, there is shown a block diagram of the automatic baud synchronizer constructed in accordance with my invention. FIG. 1 further includes a variable transversal type filter, known in the prior art, which comprises a tapped delay line 10, a plurality of automatically controlled taps and tap weight control circuits 11 and a summing network 12. The signals to the tap weight control circuits which automatically adjust the transversal filter are supplied from the receiver A/D converter 22. The transversal filter reconstitutes the received analog data waveform at the output of the receiver demodulator 13 in order to compensate for phase and attenuation distortions developed in such data waveform in its transmission from the transmitter to the receiver. The term "baud" used herein is a unit of signaling speed, that is, the signaling rate in symbols per second is expressed in bauds. My invention is used in a synchronous data communication system wherein the transmission of the data symbols is serial. Synchronous transmission requires that the receiver (i.e., the receiver sampling pulse train) be in synchronism with the time pattern of the received data waveform since such transmission technique utilizes a fixed time pattern of symbol spacing for the separation of the serial data symbols. Thus, synchronization is required in the A/D converter 22 to obtain the precise times for sampling the received analog data waveform and thereby prevent error in the conversion of the analog input to a serial binary output. My automatic baud synchronizer obtains this required receiver synchronism.

My automatic baud synchronizer broadly comprises a means that is responsive to the received analog data waveform for generating a receiver sampling pulse train at a repetition rate equal to the transmitted baud (data rate) and a means that is responsive to the average time of occurrence of the zero slope points of the received analog data waveform for synchronizing the sampling pulse train therewith. The means responsive to the received analog data waveform for generating the sampling pulse train at the transmitted baud comprises a clock pulse generator 15 phase-locked to the transmitted data rate appearing at the input to the receiver. Clock 15 generates pulses at a particular multiple of transmitted data baud, and binary logic divide circuitry reduces the particular multiple to the base baud (i.e., actual transmitted data rate). The clock pulse generator and divide circuits are of conventional design as are all of the other circuits to be hereinafter described with the exception of the adaptive threshold circuit. The phaselocking of clock pulse generator 15 with the transmitted data rate is obtained by means of a pilot tone recovery filter 16 connected between the input to the receiver demodulator 13 and the input to clock generator 15.

Although clock generator 15 may be chosen to generate clock pulses at any multiple integer of the transmitted data (and receiver sampling pulse train) baud, a multiple of $2^n$ is utilized to be compatible with binary logic divide circuits. The clock baud should be significantly greater than the receiver sampling pulse train baud for obtaining small increments of corrective phase shift which results in a greater degree of sychronism of the sampling pulse train with the received analog data waveform in the A/D converter 22. For this reason, a clock baud of 128 times base baud (the sampling pulse train repetition rate) is utilized in the following exemplary embodiment of my invention, it being recognized that a clock repetition rate of 64 baud or 256 baud would likewise be satisfactory with the attendant lesser degree of synchronism with the lower baud and more complex circuitry required for the higher baud.

The means for synchronizing the receiver sampling pulse train with the average time of occurrence of the zero slope points of the received analog data waveform will now be described and constituted the essence of my invention. My automatic baud synchronizer, and in particular, the means for synchronizing the sampling pulse train with the average time of occurrence of the zero slope points thereof is entirely digital. Since the synchronizer only makes use of points in time for which a zero slope occurs, rather than the actual value of the derivative at the sampling points on the received analog data waveform, the synchronizer is compatible with multi-level coded data formats having an arbitrary number of symbol levels. The concept of adaptive data rate may also be used in data communication systems employing my automatic baud synchronizer since the specific synchronizer to be described hereinafter, although optimized for eight symbol level coded, will synchronize properly on four or two symbol level waveforms.

Figure 2:
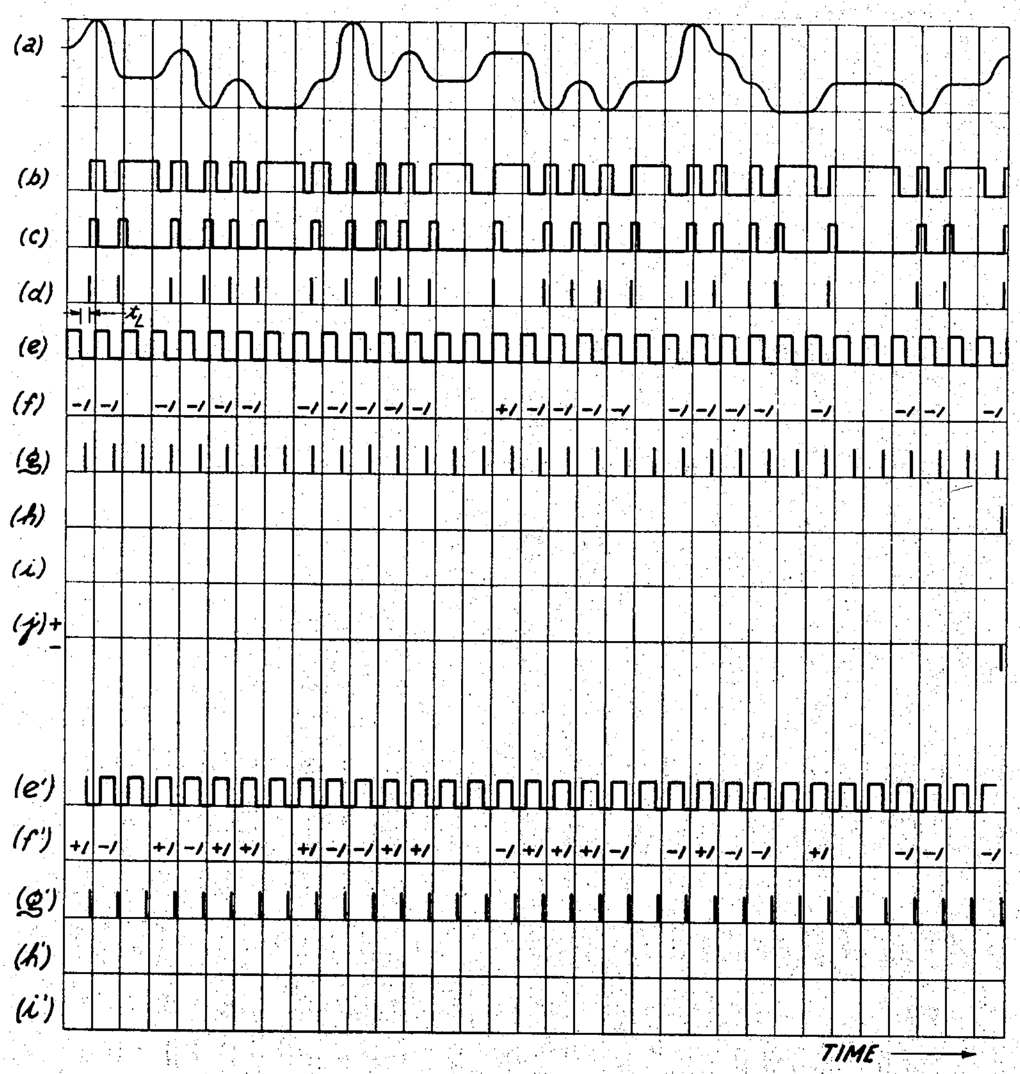
FIG. 2 is a series of waveforms in various parts of my automatic baud synchronizer for conditions of nonsynchronism and synchronism.
Figure 3:
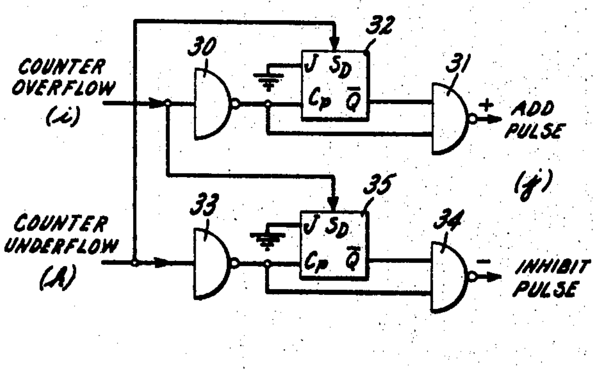
FIG. 3 is a detailed block diagram of the elements in the adaptive threshold circuit of my automatic baud synchronizer.

The means for synchronizing the receiver sampling pulse train with the average time of occurrence of the zero slope points of the received analog data waveform includes a zero slope detector circuit 17 for detecting each zero slope point of such waveform. The zero slope detector is described in detail and claimed in my copending patent application Ser. No. 861,821 filed Sept. 29, 1969, now U.S. Pat. No. 3,659,209 and assigned to the assignee of the present invention. Briefly, the zero slope detector includes positive and negative slope detectors, each detector including a voltage comparator and time delay network, and a logic gate connected to the outputs of the detectors. The function of the zero slope detector is illustrated in FIG. 2 wherein waveform (a) is the received analog data waveform at the input to the zero slope detector and waveform (b) is the constant amplitude, variable duration pulse output of the detector. The received analog data waveform (a) is illustrated for simplification purposes as a four symbol level waveform although, as mentioned above, the synchronizer is optimized for an eight symbol level coded format. The duration of each zero slope detector pulse (b) is directly proportional to the duration of zero slope of the analog data waveform, which duration is a function of the differences between immediately adjacent symbol levels. In the case of identical adjacent symbol levels, only one zero slope pulse is generated since it is assumed the analog data waveform essentially remains at zero slope during this particular time interval.

The duration or output pulse width $\tau$ of the zero slope detector can be mathematically expressed as:

$$\tau = 2\delta/Aw^2\Delta$$ 5-12 where $\delta$ is the offset voltage level of the voltage comparator, A is the peak amplitude of the input waveform, $\Delta$ is the time delay and w is the frequency of the analog data waveform. Thus, the duration of the zero slope detector output pulse is dependent on the frequency content of such input waveform.

A one-shot multivibrator 18 is connected to the output of zero slope detector 17 and is utilized to sense the leading edge of each zero slope detected output pulse. The one-shot multi-vibrator is formed by two NAND logic gates and a capacitor which is triggered by the leading edge of the zero detector output pulse.

The outputs of one-shot multivibrator 18 and clock generator 15 are connected to a NAND gate circuit 19 which includes two NAND logic gates and a control flip-flop serially connected in a closed loop circuit to form a gate that only allows one pulse from the clock generator 15 to pass in a manner described hereinafter. A 128 baud output of clock generator 15 and a 64 baud output (obtained by passing the clock output through a divide-by-two flip-flop) are connected to inputs of a first of two NAND logic gates. The output of one-shot multivibrator 18 is connected to the set direct input of the control flip-flop and sets the normal Q output thereof to a binary ONE which condition allows the next clock pulse to pass through the NAND gate circuit 19 to the "clock" input of a binary logic up-down counter 20. The output of the control flip-flop is connected to a third input of the first NAND logic gate. The output of the first NAND logic gate is connected to an input of the second NAND logic gate, and the output thereof is also connected to the clock pulse input of the control flip-flop. The NAND gate circuit 19 functions to switch the control flip-flop at the trailing edge of the clock pulse thereby setting the Q output to a ZERO and constraining the output state of the second NAND logic gate to ONE. Thus, one-shot multivibrator 18 and NAND gate circuit 19 function to supply a single clock pulse to the clock input of up-down counter 20 whenever an output pulse from zero slope detector 17 is obtained.

The error signal generated in my automatic baud synchronizer due to a condition of nonsynchronism of the average time of occurrence of the zero-slope points of the received analog data waveform with the receiver sampling pulse train is obtained by producing a signal proportional only to the polarity (sign) of time difference between the sampling times and the average zero slope time points. This signal is produced by a comparison of the times of single clock pulses passed by the NAND gate circuit 19 to counter 20 and the positive-to-negative transitions of a square waveform generated in a square wave logic circuit 21 and supplied to the "control" (count-direction) input of counter 20. The square wave logic circuit 21 is supplied with the sampling pulse train from A/D converter 21, and thus the square waveform may be described as the receiver time base waveform. The receiver time base waveform is a timing reference for counter 20 and is of the same baud as, and of a fixed, known time offset from, the sampling pulse train. My automatic baud synchronizer therefore automatically operates to reduce any error toward zero by making necessary adjustments to obtain and maintain the correct phase between the positive-to-negative transitions of the receiver time base waveform and the average time of occurrence of the clock pulses passed to counter 20. Thus, when the receiver time base waveform is phase-locked with the average time of occurrence of the clock pulses passing to counter 20, the sampling pulse train is synchronous with the average time of occurrence of the zero-slope points of the received analog data waveform.

The operation of my automatic baud synchronizer is best illustrated with reference to the series of waveforms depicted in FIG. 2, wherein each particular waveform is identified by a lower case letter, and its location also identified in the block diagram of FIG. 1. Thus, the received analog data waveform at the output of receiver demodulator 13 (in the absence of transversal filter 10, 11, 12) or, at the output of such filter, is represented by waveform (*a*). The output of zero slope detector 17, waveform (*b*), produces pulses of fixed, constant amplitude and variable duration, the duration being directly proportional to the time at which the analog data waveform remains at zero slope. The output of one-shot multivibrator 18, waveform (*c*), comprises fixed, constant amplitude pulses of fixed, constant duration having leading edges corresponding to the leading edges of the zero slope detector pulses. The particular clock pulse which is passed through NAND gate circuit 19 is indicated in waveform (*d*) and the count direction square wave produced by square wave logic circuit 21 is indicated in waveform (*e*).

The count direction square waveform (*e*) is illustrated in a non-phase locked condition with the clock pulses supplied to counter 20 [the positive-to-negative transition of waveform (*e*) leads the clock pulses (*d*) by time $T_L$ in the case of the first pulse ] and this condition is evident by the predominantly down or negative (−) count produced in counter 20 indicated in waveform (*f*). Each down count occurs due to a clock pulse (*d*) occurring during the low state of waveform (*e*). This non-phase locked condition of the receiver time base waveform is also indicated in the sampling pulse train, waveform (*g*), being substantially out of phase with the zero slope points of the received analog data waveform. The down counts in counter 20 eventually produce an underflow output pulse, waveform (*h*). In like manner, a particular number of net up counts would produce an overflow pulse, waveform (*i*).

From waveforms (*b*), (*d*) and (*e*) it can be seen that each counter underflow (or overflow) is an indication that the positive-to-negative transition of receiver time base waveform (*c*) is leading (or lagging) the average time of occurrence of the zero slope detector output pulses (*b*) whose leading edges are synchronous with clock pulses (*d*). The underflow (or overflow) pulse is then supplied to a digital phase shift circuit 24 which is also supplied with the clock pulses from the output of clock 15 at both 128 and 64 baud. The digital phase shifter comprising a pair of flip-flops and five NAND logic gates as one exemplary embodiment inhibits or adds single clock pulses at 64 baud counter formed by divide-by-4 counter 265 and a divide-by-16 circuit within A/D converter 22. It can be appreciated that in the more general case, the divide-by-64 circuit can be completely external of converter 22. The net effect of the digital phase shifter in inhibiting (or adding) single clock pulses at 64 baud in response to the underflow (or overflow) pulse supplied thereto is to shift the positive-to-negative transition of the receiver time base waveform (*e*) in the direction of the average time of occurrence (i.e., leading edge) of the pulses (*b*) at the output of the zero slope detector by one period of a 64 baud clock. It can thus be seen that the up-down counter serves to integrate the time of occurrence of the pulses from the zero slope detector, that is, obtain the average time of occurrence thereof, and to generate correction commands which phase shift the count direction square wave (receiver time base waveform) to the desired position by small fractional (1/64) periods of the receiver time base to thereby obtain an automatic, and sensitive baud synchronizer.

An adaptive threshold circuit 23 is connected between the outputs of up-down counter 20 and inputs to digital phase shifter 24 to prevent hunting or oscillation in the loop comprising digital phase shifter 24, the divide-by-64 counter, square wave logic circuit 21 and up-down counter 20 when the baud synchronizer has converged to a locked state (i.e., when the sampling pulse train is synchronous with the average occurrence of the zero slope points of the analog data waveform). This locked state is illustrated by waveforms (*e'*) (*f'*) and (*g'*) and the lack of any underflow or overflow pulses (*h'* and *i'*), these waveforms being directly related to waveforms (*a*), (*b*), (*c*) and (*d*). The adaptive threshold circuit 23 inhibits any commands from up-down counter 20 to digital phase shifter 24 unless two identical commands are successively generated in which case the second command is allowed to pass to digital phase shifter 24 thereby effecting the indicated change. In the condition when the automatic baud synchronizer is not phase-locked, that is, the sampling pulse train is out of phase with the average time of occurrence of the zero slope points of the analog data waveform, it may be assumed that successive commands to the phase shifter will be identical and the adaptive threshold circuit merely yields a time delay. The adaptive threshold circuit may thus be viewed as being an added stage in the up-down counter in the phase-locked mode of my automatic baud synchronizer.

The adaptive threshold circuit which comprises a part of my invention is comprised of a first circuit including a first NAND logic gate 30 having an input connected to the overflow line output (*i*) of counter 20, and a second NAND logic gate 31 having a first input thereto connected to the output of gate 30. The output of gate 30 is also connected to a clock pulse $C_p$ input of a control flip-flop 32. The flip-flop complement output $\bar{Q}$ is connected to a second output of gate 31 and the output of gate 31 supplies the ADD command pulse to digital phase shifter 24. The adaptive threshold circuit further includes a second circuit which is identical to the first, comprising a third NAND logic gate 33, a fourth NAND logic gate 34 and a second control flip-flop 35. The input to gate 33 is connected to the overflow line output (*h*) of counter 20 and the outputs of gate 33 are supplied to the clock pulse input of flip-flop 35 and a first input of gate 34. The complement $\bar{Q}$ output of flip-flop 35 is connected to a second input of gate 34. Finally, the overflow line output of counter 20 is also connected to the set direct $S_D$ input of flip-flop 35 and the underflow line output of the counter is connected to the set direct input of flip-flop 32. The output of gate 34 supplies the INHIBIT command pulse to the digital phase shifter. The ADD or INHIBIT command pulses which are passed through the adaptive threshold circuit occur only after two successive overflows or underflows of the counter are obtained.

In one specific embodiment of my automatic baud synchronizer, pilot tones of 600 and 3,000 Hertz were transmitted and the square wave logic circuit 21 was designed to generate a square waveform at a repetition rate of the difference frequency of 2,400 Hertz in accordance with the frequency difference between the pilot tones. It is thus seen that my automatic baud synchronizer can be employed with any transmitted data rate by merely changing the pilot tone frequencies to obtain the desired square wave repetition rate. Although my automatic baud synchronizer is theoretically operable with any transmitted data rate, it can be appreciated that the particular elements comprising a particular square wave logic circuit limit the maximum transmitted data rate to approximately ten times the present value.

From the foregoing, it is readily apparent that the objectives set forth have been met. Thus, my invention provides a simplified method and apparatus for synchronizing a receiver sampling pulse train with the received analog data waveform, and accomplishes this by utilizing the average time of occurrence of the zero slope points of the received waveform. The adaptive threshold circuit eliminates hunting in the control loop of my automatic baud synchronizer when it has converged to the phase-locked state by preventing any commands from the updown counter from reaching the digital phase shifter unless two identical commands are successively generated in the counter.

What I claim as new and desire to secure by Letters Patent of the United States is:

1. An adaptive threshold circuit comprising a first circuit comprising first and second interconnected NAND logic gates and a first flip-flop wherein the input to said first circuit is connected to a first source of binary logic signals representing a first of two states of a particular phenomenon, output of said first NAND logic gate directly connected to a first input of said second NAND logic gate, and a second circuit comprising third and fourth interconnected NAND logic gates and a second flip-flop wherein the input to said second circuit is connected to a second source of binary logic signals representing a second of the two states of the particular phenomenon, output of said third NAND logic gate directly connected to a first input of said fourth NAND logic gate, said first and second flip-flops having respective set direct input terminal connections to the second and first sources of binary logic signals whereby said adaptive threshold circuit passes a pulse from the first or second sources only after two pulses are successively supplied from one of the first or second sources of binary logic signals.

2. The adaptive threshold circuit set forth in claim 1 wherein an input to said first NAND logic gate connected to said first source, said first flip-flop having a clock pulse input connected to the output of said first NAND logic gate, the set direct input of said first flip-flop connected to said second source, the complement output of said first flip-flop connected to a second input of said second NAND logic gate, an input to said third NAND logic gate connected to said second source, said second flip-flop having a clock pulse input connected to the output of said third NAND logic gate, the set direct input of said second flip-flop connected to said first source, the complement output of said second flip-flop connected to a second input of said fourth NAND logic gate.

* * * * *